United States Patent [19]
Miyoshi et al.

[11] 3,936,719
[45] Feb. 3, 1976

[54] HIGH VOLTAGE GENERATOR FOR A TELEVISION RECEIVER

[75] Inventors: Keisuke Miyoshi, Katano; Naoki Shibano, Sakai, both of Japan

[73] Assignee: Matsushita Electric Industrial Co., Ltd., Osaka, Japan

[22] Filed: Nov. 15, 1973

[21] Appl. No.: 416,119

[30] Foreign Application Priority Data
Nov. 20, 1972 Japan.............................. 47-116936
Nov. 20, 1972 Japan.............................. 47-116973
Nov. 20, 1972 Japan.............................. 47-116974

[52] U.S. Cl................... 321/2; 321/15; 321/27 R; 315/411; 178/DIG. 11
[51] Int. Cl.²........................................... H02M 3/22
[58] Field of Search........ 178/DIG. 11, 7.5 R; 321/2, 321/15, 47, 2 HF, 27 R; 315/27 R, 411; 336/69, 182

[56] References Cited
UNITED STATES PATENTS

| | | | |
|---|---|---|---|
| 3,225,258 | 12/1965 | Brekoo et al. | 321/15 |
| 3,275,920 | 9/1966 | Shimada | 321/8 R |
| 3,395,313 | 7/1968 | Rogers | 178/DIG. 11 |
| 3,562,623 | 2/1971 | Farnsworth | 321/2 |
| 3,569,818 | 3/1971 | Dahlinger | 321/2 |
| 3,665,288 | 5/1972 | Godawski | 321/24 |

FOREIGN PATENTS OR APPLICATIONS

| | | | |
|---|---|---|---|
| 1,007,861 | 2/1955 | Germany | 321/27 R |

*Primary Examiner*—William M. Snoop
*Attorney, Agent, or Firm*—Stevens, Davis, Miller & Mosher

[57] ABSTRACT

A high voltage generator comprising a high voltage generating transformer having a primary winding and first and second secondary windings, a first rectifier having one end connected to one end of the first secondary winding, a capacitor connected to the other end of the first rectifier and adapted to be charged with the voltage appearing at the other end of the first rectifier, a second rectifier connected between the connection point between said first rectifier and said capacitor and one end of the second secondary winding, and a third rectifier for high voltage rectification connected to the other end of the second secondary winding. With this construction variation of the output high voltage with change in load current can be reduced.

4 Claims, 6 Drawing Figures a b

HIGH VOLTAGE GENERATOR FOR A TELEVISION RECEIVER

This invention relates to high voltage generators using a transformer for use particularly in television receivers.

Figure 1:
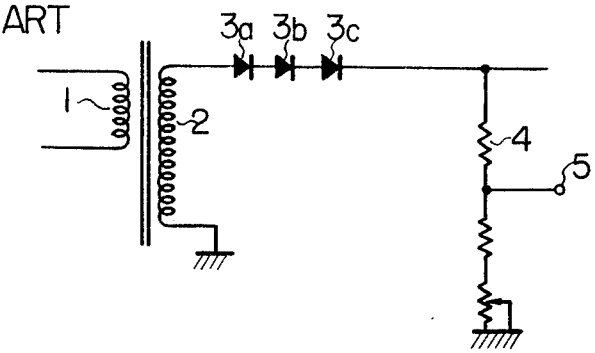
FIGS. 1 and 2 show prior art examples of the high voltage generator.

FIG. 1 shows a prior art example of the high voltage generator using a sealed flyback transformer. In the flyback transformer shown in FIG. 1, third harmonic tuning is achieved between the primary and secondary windings. In this case, the high voltage output impedance is about 3.5 to 4.0 megohms. However, with such high output impedance the amplitude of the video voltage is prone to great variations due to variations of the d-c high voltage. To stabilize the high voltage, use has heretofore been made of high voltage stabilizer tubes in case of vaccum tube television sets and high voltage control reactors or like means in transistorized television sets. The use of these parts for the purpose of the high voltage stabilization, however, has led to increased power consumption and increased cost.

Figure 2:
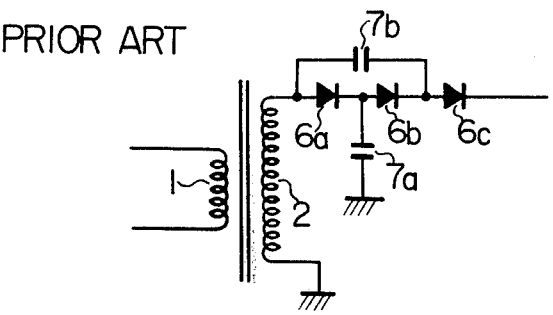

It has also been contemplated to obtain fifth harmonic tuning between the primary and secondary windings. However, with the sealed flyback transformer of the liquid insulation type, in which the dielectric constant is high compared to the case of a dry insulation flyback transformer, the distributed capacitance with respect to the secondary winding is increased. Also, in a flyback transformer of the half wave rectification type, the number of turns of the secondary winding is large compared to the case of double voltage or triple voltage rectification systems. Further, the tuning ratio between the primary and secondary windings has to be increased in order to obtain a voltage as high as that of the third harmonic tuning system. This means an extreme increase of the distributed capacitance on the secondary side. For the above reasons, it has been very difficult to take the fifth harmonic tuning. Higher order harmonic tuning may be obtained comparatively simply with double voltage or triple voltage rectification systems. However, capacitors are required to this end; for instance capacitors 7a and 7b are required in a double voltage rectification system as shown in FIG. 2. Also, with regard to the ratings of the high voltage rectifiers the double or triple voltage rectification system has to use rectifiers of high ratings, so that it is surpassed by the half wave rectification system (of FIG. 1) so far as cost and reliability are concerned. In FIG. 1, reference characters 3a, 3b and 3c designate high voltage rectification diodes, and character 4 a super-high resistance resistor for voltage division. In FIG. 2, characters 6a, 6b and 6c designate double voltage rectification diodes.

The present invention seeks to overcome the above drawbacks, and its object is to reduce variations of the high voltage output of the transformer by reducing the high voltage impedance thereof.

According to the invention, the secondary winding of the transformer consists of first and second secondary windings connected to each other through diodes such that the second secondary winding is kept above ground potential. With this construction, the stray capacitance on the secondary side can be reduced to reduce the high voltage output impedance, so that it is possible to reduce variation of the high voltage output due to change in load current by tuning more than third higher harmonics.

Also, with the high voltage generator according to the invention an intermediate voltage may be taken out from the connection point between the first rectifier and capacitor, and this voltage may be utilized as the focusing voltage for the television picture tube.

Now, an embodiment of the invention will be described in connection with the accompanying drawings.

Figure 3:
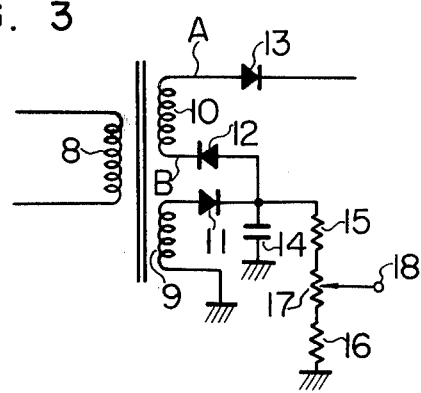
FIG. 3 is a circuit diagram showing an embodiment of the high voltage generator according to the invention.
Figure 4:
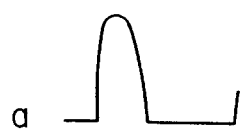
FIG. 4 shows waveforms appearing in the operation of the same.
Figure 4:
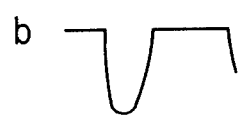

FIG. 3 shows an embodiment of the invention. In this system, the fifth harmonic tuning is taken between a primary winding 8 and a second secondary winding 10 for reducing the high voltage output impedance. In order to take higher harmonic tuning than third harmonic, it is necessary to reduce the distributed capacitance on the secondary side. Accordingly, in this embodiment the second secondary winding 10 is held above ground potential by a rectifier 12. Thus, pulse voltage waveforms $a$ and $b$ as shown in FIG. 4 appear at opposite ends A and B of the second secondary winding 10, if the transformer is equivalently ideal. If this is so, it is easier to take higher order harmonic tuning with reduced distributed capacitance equivalently on the secondary side. In case of taking the fifth harmonic tuning, however, the high voltage output voltage is reduced compared to the case of taking the third harmonic tuning. Accordingly, the d-c voltage obtained across the second secondary winding 10 is superimposed upon the d-c voltage of several kilovolts obtained through the rectification of the pulse voltage induced in the first secondary winding 9 in order to obtain the requisite d-c high voltage.

Figure 6:
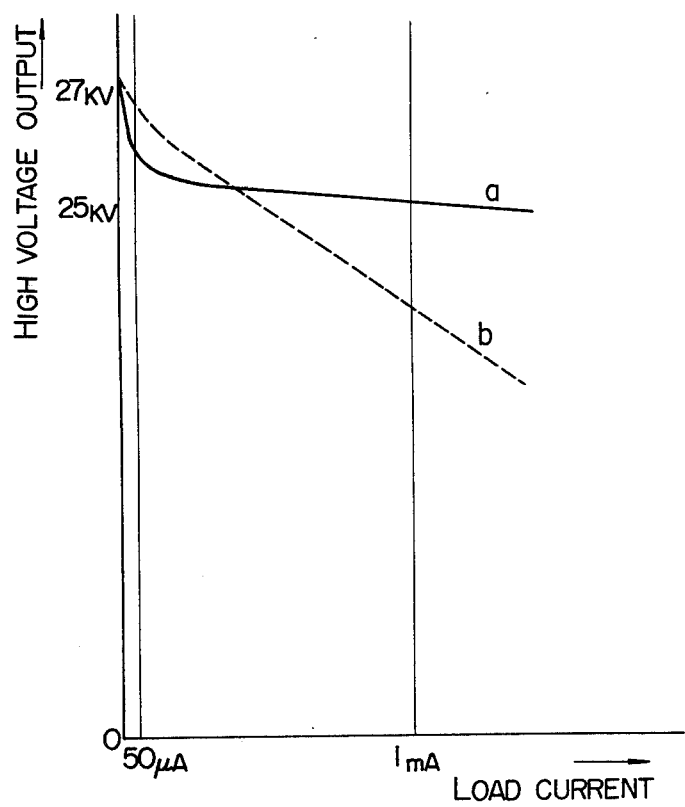
FIG. 6 is a graph showing an output voltage versus load current characteristic of the same generator.

FIG. 6 shows the high voltage output characteristic (curve $a$) of the flyback transformer according to the invention and that (curve $b$) of a prior art flyback transformer.

It will be seen that according to the invention that the change of the high voltage output for load current range above about 50 microamperes is small compared to the case of the prior art flyback transformer. Although the high voltage output is subject to less change in case of the prior art flyback transformer for a load current range from 0 to about 50 microamperes, the brightness that can stimulate the sight usually corresponds to load current levels above 50 to 1,000 microamperes, and the load current usually ranges from about 50 microamperes to about 1,000 microamperes even in household sets. In case of a high voltage generator of a battery driven small television set a great number of turns is required for the secondary winding of the high voltage generating transformer. In such case, by using the transformer according to the invention the distributed capacitance on the secondary side can be equivalently reduced. In the circuit of FIG. 3, the first secondary winding is connected at one end to ground and at the other end to a rectifier 11. A capacitor 14 is connected between the other end of the rectifier 11 and ground so that it is charged with the voltage appearing at the other end of the rectifier 11. The other end of the rectifier 11 is also connected directly to the rectifier 12, whose other end is in turn connected to the end B of the second secondary winding 10. The other end A of the second secondary winding is connected to a further rectifier 13 for high voltage rectification. In a television receiver using a bi-potential picture tube, a d-c voltage of several kilovolts is required for the focusing electrode. This focusing voltage may be obtained from the terminal voltage across the capacitor 14 by dividing it through a voltage divider consisting of resistors 15 and 16 and a variable resistor 17, the division voltage being taken out from a terminal 18.

Figure 5:
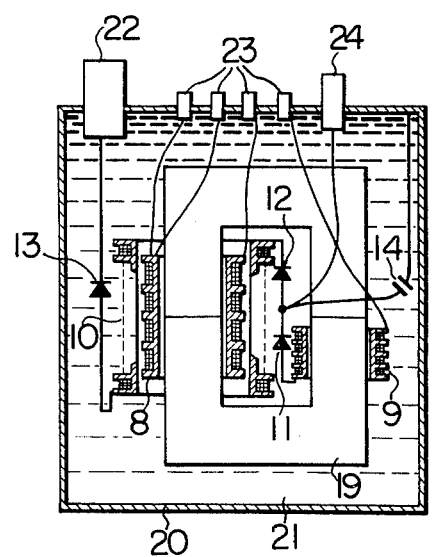
FIG. 5 is a sectional view showing the construction of the same generator.

FIG. 5 shows the mechanical construction of the high voltage generator embodying the invention. In the Figure, numeral 19 designates a core, numeral 20 a casing, numeral 21 oil, numeral 22 a high voltage terminal, numeral 23 low voltage terminals, and numeral 24 a medium voltage terminal.

While in the embodiment of FIG. 5 oil is used for insulation, it is also possible to realize the insulation with wax impregnation or resin impregnation or dry insulation since each of the diodes 11, 12 and 13 shares one-third of the voltage so that the peak value of the secondary side a-c voltage is reduced to one-thid compared to the case of FIG. 1.

In case of a uni-potential picture tube requiring no focusing potential, the capacitor 14, resistors 15 and 16 and variable resistor 17 can be omitted.

What we claim is:

1. A high voltage generator for energizing a cathode ray tube of a television receiver comprising a high voltage transformer having a primary winding and first and second secondary windings; a first rectifier having one end connected to one end of said first secondary winding, the other end of said first secondary winding being directly connected to ground, said first rectifier being connected in series with said first secondary winding; a second rectifier connected directly between the other end of said first rectifier and one end of said second secondary winding, the connection point between said first and second rectifiers forming a terminal for the derivation of a D.C. voltage; and a third rectifier having one end connected to the other end of said second secondary winding, the other end of said third rectifier being connected to an anode of said cathode ray tube, said second rectifier, said second secondary winding, and said third rectifier being connected in series, whereby fifth or higher odd harmonic tuning is obtained between said primary winding and at least one of said first and second secondary windings.

2. The high voltage generator according to claim 1, wherein said three rectifiers and said high voltage generating transformer are sealed in a casing filled with insulating oil.

3. The high voltage generator according to claim 1 wherein said high voltage generating transformer is insulated in dry insulation.

4. A high voltage generator for energizing a cathode ray tube of a television receiver comprising a high voltage transformer having a primary winding and first and second secondary windings; a first rectifier having one end connected to one end of said first secondary winding, the other end of said first secondary winding being directly connected to ground, said first rectifier being connected in series with said first secondary winding; a second rectifier connected directly between the other end of said first rectifier and one end of said second secondary winding; a capacitor connected between ground and the connection point between said first rectifier and said second rectifier for storing the voltage between said connection point and ground, and variable resistance means connected in parallel with said capacitor, the voltage obtained from said variable resistance means being applied to a focusing electrode of said cathode ray tube; and a third rectifier having one end connected to the other end of said second secondary winding, the other end of said third rectifier being connected to an anode of said cathode ray tube, said second rectifier, said second secondary winding, and said third rectifier being connected in series, whereby fifth or higher odd harmonic tuning is obtained between said primary winding and at least one of said first and second secondary windings.

* * * * *